US008612158B2

(12) United States Patent
Yu

(10) Patent No.: US 8,612,158 B2
(45) Date of Patent: Dec. 17, 2013

(54) SEISMIC INTERFERENCE NOISE ELIMINATION

(75) Inventor: Margaret Chen Yu, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 205 days.

(21) Appl. No.: 13/031,970

(22) Filed: Feb. 22, 2011

(65) Prior Publication Data

US 2011/0276274 A1 Nov. 10, 2011

Related U.S. Application Data

(60) Provisional application No. 61/332,133, filed on May 6, 2010.

(51) Int. Cl.
*G06F 19/00* (2011.01)

(52) U.S. Cl.
USPC .................................. 702/17; 367/38; 367/43

(58) Field of Classification Search
USPC ......................................... 702/17; 367/38, 43
See application file for complete search history.

(56) References Cited

U.S. PATENT DOCUMENTS

| | | | |
|---|---|---|---|
| 4,760,563 A | 7/1988 | Beylkin | |
| 4,884,248 A * | 11/1989 | Laster et al. | 367/73 |
| 4,937,794 A * | 6/1990 | Marschall et al. | 367/21 |
| 5,014,249 A | 5/1991 | Brink | |
| 5,189,644 A * | 2/1993 | Wood | 367/38 |
| 5,293,352 A * | 3/1994 | Chambers | 367/38 |
| 5,448,531 A | 9/1995 | Dragoset, Jr. | |
| 5,818,795 A | 10/1998 | Hawkins et al. | |
| 5,971,095 A | 10/1999 | Ozbek | |
| 6,295,505 B1 * | 9/2001 | Assa et al. | 702/17 |
| 6,446,008 B1 | 9/2002 | Ozbek | |
| 6,651,007 B2 | 11/2003 | Ozbek | |
| 6,691,039 B1 | 2/2004 | Wood | |
| 6,721,662 B2 | 4/2004 | Wood | |
| 7,239,578 B2 | 7/2007 | Robinson | |
| 7,328,108 B2 * | 2/2008 | Robertsson et al. | 702/17 |
| 7,366,054 B1 | 4/2008 | Wood | |
| 7,561,491 B2 * | 7/2009 | Robinson | 367/43 |
| 7,564,740 B2 | 7/2009 | Wood | |
| 7,591,491 B2 | 9/2009 | Lizenby et al. | |
| 7,936,640 B2 * | 5/2011 | Robinson | 367/38 |
| 8,139,440 B2 * | 3/2012 | Ferber et al. | 367/38 |
| 2005/0180262 A1 * | 8/2005 | Robinson | 367/47 |
| 2008/0221801 A1 * | 9/2008 | Craft et al. | 702/17 |
| 2009/0180351 A1 | 7/2009 | Paffenholz et al. | |
| 2009/0262602 A1 * | 10/2009 | Robinson | 367/43 |
| 2009/0295167 A1 * | 12/2009 | Clidaras et al. | 290/55 |

OTHER PUBLICATIONS

McMechan, et al., "Depth filtering of first breaks and ground roll", Geophysics, vol. 56, No. 3, Mar. 1991.*
Yu MC, "Seismic interference noise elimination—a multidomain 3D filtering approach", SEG San Antonio 2011 Annual Meeting, p. 3591.*
Akbulut, et al., Suppression of Seismic Interference Noise on Gulf of Mexico Data, Offshore Technology Conference, 1985, pp. 303-308.

(Continued)

*Primary Examiner* — Jonathan C Teixeira Moffat
*Assistant Examiner* — Ruihua Zhang

(57) ABSTRACT

An automatic and robust method to attenuate seismic interference noises in marine seismic survey using multi-dimensional filters in Tau-P domain to identify and isolate seismic interference noises as anomalies.

20 Claims, 13 Drawing Sheets

(56) References Cited

OTHER PUBLICATIONS

Mitchell, et al., Efficient Tau-p Hyperbolic Velocity Filtering, Geophysics, May 1990, pp. 619-625, vol. 55, No. 5.

Noponent, et al., Attenuation of Waterborne Coherent Noise by Application of Hyperbolic Velocity Filtering during the Tau-p Transform, Geophysics, Jan. 1986, pp. 20-33, vol. 51, No. 1.

Schultz, Seismic Data Processing: Current Industry Practice and New Directions, Geophysics, Dec. 1985, pp. 2452-2457, vol. 50, No. 12.

Lynn, et al., Experimental Investigation of Interference from other Seismic Crews, Geophysics, Nov. 1987, p. 1501-1524, Vo. 52, No. 11.

Karsli, et al., Application of Complex-Trace Analysis to Seismic Data for Random-Noise Suppression and Temporal Resolution Improvement, Geophysics, May-Jun. 2006, pp. V79-V86, vol. 71, No. 3.

Gulunay, et al., Spatial Prediction Filters for Attenuation of Seismic Interference Noise, SEG Expanded Abstracts, CR1837.

Gulunay, Two Different Algorithms for Seismic Interference Noise Attenuation, The Leading Edge, Feb. 2008, pp. 176-181.

Gulunay, et al., Seismic Interference Noise Attenuation, SEG International Exposition and 74th Annual Meeting, Oct. 2004.

Huaien, et al., Attenuation of Marine Coherent Noise, In the 59th Annual International Meeting of Society Exploration Geophysicist, 1989, pp. 113-114.

Lie, Seismic Interference, Filtering Methods and Revised Noise Limits, Advances in Underwater Technology, Ocean Science and Offshore Engineering, 1988, vol. 16.

Rajput, et al., Attenuating the Seismic Interference Noise on three-dimensional seismic data by frequency-receiver-shot(f-x-y) prediction filters, Current Science, Aug. 2008, pp. 501-504, vol. 95, No. 4.

Anonymous, "Advanced Demultiple for Wide-Azimuth Data," CGG Veritas: Tau-Px-Py, Nov. 2010: p. 1, <http://web.archive.org/web/20101121113749/http://cggveritas.com/default.aspx?cid=4-11-2867>.

Donati et al., "Seismic reconstruction using a 3D tau-p transform," CREWS Research Report, 1995, vol. 7: pp. 11-1-11-16, <http://www.crews.org/ForOurSponsors/ResearchReports/1995/1995-11.pdf>.

\* cited by examiner

SEISMIC INTERFERENCE NOISE ELIMINATION

CROSS-REFERENCE TO RELATED APPLICATIONS

The present application claims priority under 35 U.S.C. §119(e) to U.S. Provisional Application Ser. No. 61/332,133 filed on May 6, 2010, with the same title and by the same inventor.

BACKGROUND OF THE INVENTION

1. Field of the Invention

This invention relates data processing for geophysical exploration and oil production, more specifically related to attenuate noises in marine seismic data, to attenuate seismic interference noises.

2. Description of the Related Art

Seismic exploration is the most widely used geophysical exploration. It involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposit.

Depending on the area being surveyed, there are marine seismic survey, which is done in open water, or land seismic survey which is done on land; or transition zone, which is done on shallow water or marsh land. For "marine" surveys, which are conducted in open water, they can be conducted not only in saltwater environments, but also in fresh and brackish waters. In one type of marine survey, called a "towed-array" survey, an array of seismic sensor-containing streamers and sources is towed behind a survey vessel In seismic exploration, removing noises from various sources while preserving desired signal is always a challenge.

In the marine environment, the signals from other seismic vessels in adjacent areas are one type of major noises. Strong seismic interference (SI) noises generated by other seismic acquisition vessels are common in petroleum exploration basins. When the SI is particularly strong, the processed data may still contain high level of SI noises and may make the data unusable.

Conventionally, SI noise attenuation can be performed either in Offset-Time (X-T) Common Midpoint Gather (CMP) domain or Time-slowness (Tau-P) domain using amplitude discrimination of SI noise from surrounding signal in a 2D approach. Frequency-Wavenumber (FK) domain may also be used where FK filtering is done by others to help in attenuating the SI noise. Noise predictions in f-x or f-x-y domains were also suggested to attenuate SI noises. Other generic noise attenuation methods have been used to treat SI noises.

These conventional methods attenuate some SI noise to some extent, but fail to attenuate the SI trend. The conventional methods tend to remove some of the SI noise but leave a discontinuous trend of residual SI noise.

Several conventional methods are described by the following papers, or patent publications, which are incorporated by references:

Akbulut, K., Saeland, O., Farmer, P. and Curtis, J., Suppression of seismic interference noise on Gulf of Mexico data. In 54th Annual International Meeting of Society of Exploration Geophysicists, Expanded Abstracts, 1984, pp. 527-529

Mitchell, A. et al, Efficient tau-p hyperbolic velocity filtering, Geophysics, Vol 55, No. 5, (May 1990), p 619-625

Noponent, I. et al, Attenuation of waterborne coherent noise by application of hyperbolic velocity filtering during tau-p transformation, Geophysics, Vol 51, No. 1, (January 1986), p 20-33

Schultz, P., Seismic data processing: current industry practice and new directions, Geophysics, Vol 50, No. 12, (December 1985), p 2452-2457

Lynn, W., Doyle, M., Lamer, K. and Marschall, R., Experimental investigation of interference from other seismic crews. *Geophysics*, 1987, 52, 1501-1524

Karsli, H. et al., Application of complex-trace analysis, Geophysics, Vol 71, No. 3, (May 2006), p V79-V86

Gulunay, N. et al, Spatial prediction filters for attenuation of seismic interference noise, SEG Expanded Abstracts, CR1837

Gulunay, N., Two different algorithms for seismic interference noise attenuation. Leading Edge, February 2008, p 176-181

Gulunay, N., Magesan, M. and Baldock, S., Seismic interference noise attenuation. In 74th Ann. Internat., Mtg., SEG, Expanded Abstracts, 2004, pp. 1973-1976

Huaien, W., Guangxin, L., Curtis, E. H. and Snyder, F. C., Attenuation of marine coherent noise. In 59th Annual International Meeting of Society of Exploration Geophysicists, Expanded Abstracts, 1989, pp. 1112-1114

Lie, J. E., Seismic Interference, Filtering Methods and Revised Noise Limits; A/S Geoteam; Oceanology '88: Proceedings of an international conference, Mar. 8-11, 1988, Brighton, UK Rajput, S. et al., Attenuating the seismic interference noise on three-dimensional seismic data by frequency—receiver—shot (f-x-y) prediction filters; Schlumberger Reservoir Seismic Services, Mumbai, India National Geophysical Research Institute, Hyderabad 500 007, India, Department of Geophysics, Indian Institute of Technology, Roorkee 247 667, India The US patent publications include: U.S. Pat. Nos. 6,446,008, 4,760,563, 6,651,007, 5,448,531, 7,366,054, 7,591,491, 7,564,740, 7,239,578, 6,691,039, 4,937,794, 5,971,095, 5,014,249 and 5,818,795.

It is desirable to have a method to attenuate SI noises more efficiently and without leaving too much residual noises.

BRIEF SUMMARY OF THE INVENTION

According to the methods described here, the seismic data are transformed from X-T domain to Tau-P domain. SI noises are identified by multi-dimensional filters and isolated. The SI noises are then transformed back to X-T domain and removed from the original dataset. Additional steps may be also used before transformation, in Tau-P domain or after transformation to make the methods more robust or more efficient.

The methods are robust and can handle data sets from various water depths, with different SI source directions, and SI with various strengths. No prior knowledge of the SI noise source position or character is required for using the methods.

BRIEF DESCRIPTION OF THE SEVERAL VIEWS OF THE DRAWINGS

A better understanding of the invention can be had when the following detailed description of the preferred embodiments is considered in conjunction with the drawings, in which.

DETAILED DESCRIPTION OF THE INVENTION

A better understanding of the invention can be had when the following detailed description of the preferred embodiments is considered in conjunction with the drawings.

The methods discussed below are robust and can handle data sets from various water depths, with different SI source directions and SI with various strengths. No prior knowledge of the SI noise source position or character is required for the application of these methods. The initial parameterization is based on the data itself. This is in contrast to many conventional methods that require significant human interpretation and parameterization or QC on a shot by shot basis or the knowledge about the SI sources.

The SI noise removal methods described here are typically one processing step in the overall seismic data processing work flow. Some of the steps in these methods may be performed in other processing modules, if so, such steps may be skipped in these methods.

Figure 1:
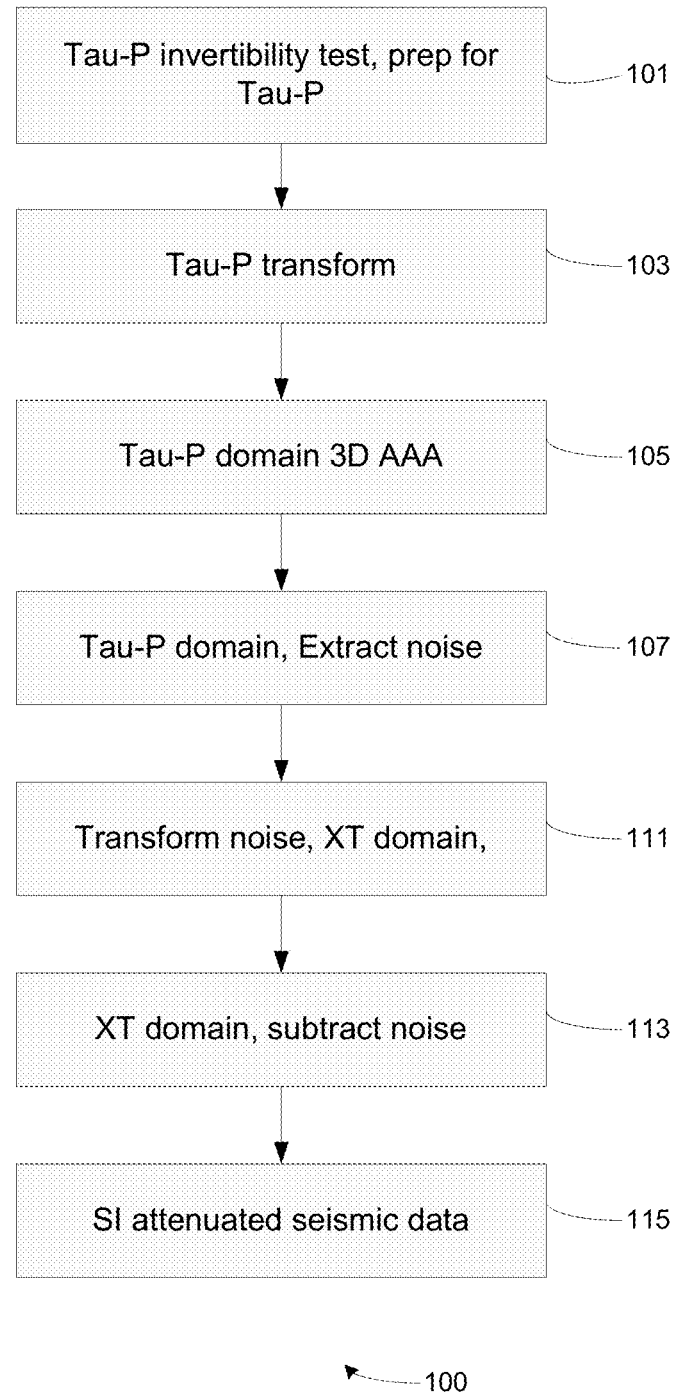
FIG. 1 shows a flow diagram of an embodiment of the current invention.

Referring to FIG. 1, according to one SI removal method 100, there are several steps:

The first step 101 is to prepare seismic dataset by sorting/organizing them into a collection of subsurface lines shot order. The data are checked for Tau-P invertibility as well to minimize errors during transformation and reverse transformation. If the data are already checked or are organized by other processing steps, then this step may be skipped.

The step 103 is to transform the shot X-T domain seismic data into the Tau-P domain. The X-T domain to Tau-P domain transformation is well known in the art, the details of which can be found in many of the cited prior art references. The SI noise in Tau-P domain is typically organized into various localized areas in Tau-P domain at different Tau's according to the direction of SI. SI noises may be located at different area as comparing to signals. Many prior art methods exploit such characteristic to attenuate SI noises. But filters based on P are usually too simplistic and not sufficient in many survey areas.

In step 105, an automated SI noise detection, noise attenuation and seismic signal protection are achieved simultaneously by comparing several consecutive Tau-P shots through multiple multi-dimensional spatial filters that move across user designed windows of P-traces, shot position, and Tau. One such tool to perform this step is a 3D Anomalous Amplitude Attenuation module. A 3D spatial filter used is illustrated in FIG. 2

Figure 2:
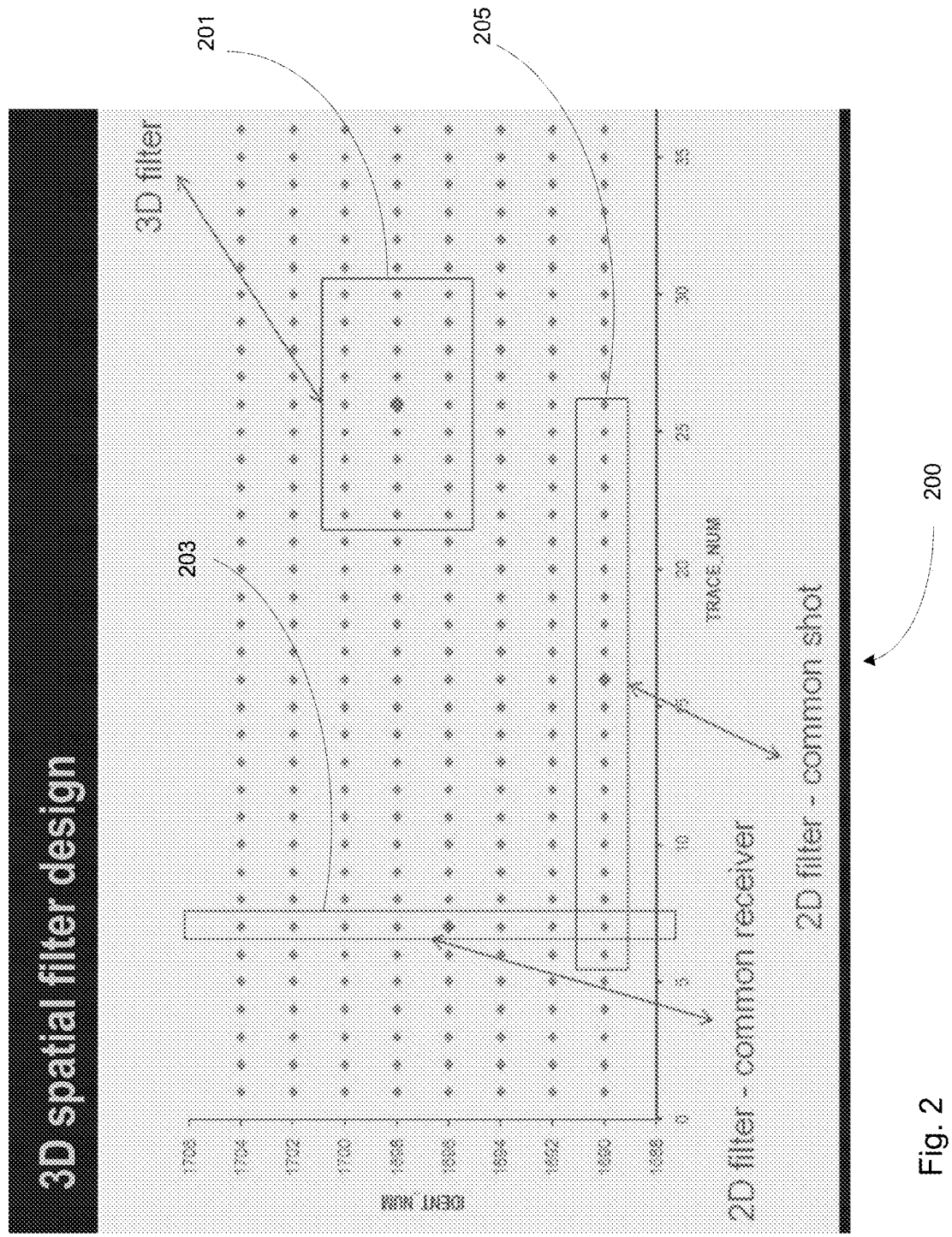
FIG. 2 shows conceptual designs for several filters including 2D and 3D spatial filters.

Referring to FIG. 2, the x-axis and y-axis in Tau-P domain are represented by P trace (e.g. TRACE_NUM) and shot-point number (e.g. IDENT_NUM), respectively. In a typical implementation, a 3D spatial filter is designed for the particular survey. The 3D spatial filter width, length and window length may vary according to the spread of SI noise within a shot itself and across consecutive number of shots. SI noise amplitudes are identified based on an amplitude threshold within the specified 3D windows. SI noise amplitudes are either down-weighted or replaced with interpolated data using neighboring traces. This 3D spatial filter is designed and applied to all acquired shots. No manual intervention is required, e.g. pre-selecting SI contaminated shots and areas. The characteristic of SI noise, which has similar bandwidth to signal energy, but with different or higher amplitude and different moveout, makes Tau-P domain implementation efficient and robust. While adjacent acquired shots on a survey line carry similar geological structures the SI energies have traveled through different ray paths thus transforms to different areas in Tau-P domain than seismic energies. The designed 3D filter scans the number of consecutive shots along the line direction together with Tau and P axis sample by sample and window by window. Within the 3D filter window each sample amplitude is compared with the mean amplitude derived from the designed filter window, SI noise amplitude is then identified, isolated and extracted automatically from any given shot based on user defined threshold. These SI noises are considered as anomalous amplitude within the set window. The anomalous amplitude of a sample is scaled down when it exceeds the mean amplitude level in each window.

In FIG. 2, only two dimensions for the multi-dimension filter are illustrated. A 3D filter 201 is used, but two dimensional filters, such as 2D common receiver or P trace filter 203 or 2D common shot filter 205 may also be used. In the examples discussed in this application, 3D filters are used. The number of dimensions of the filters may vary depending on the need of the particular dataset. Other commonly used dimensions include inline positions, crossline positions, offsets and azimuth.

Using the designed multi-dimensional filter, the entire dataset can be scanned, wherein each shot/trace is compared to its neighboring shots/traces within the specified windows. The anomalous amplitudes are identified and isolated. If they are above certain threshold, then they will be determined to be SI noises.

In step 107, SI noises identified above are extracted in Tau-P domain. The noises may also be identified by amplitude discrimination within discrete frequency bands in Tau-P domain.

In step 111, the extracted anomalous SI noises are transformed back to X-T shot domain.

Finally, in step 113 the SI noises in X-T domain are subtracted from the original, untransformed seismic data to produce the output—SI attenuated seismic data 115. It is noted that to minimize transformation errors, noise subtraction is done in the X-T domain, rather than in the Tau-P domain, although it can be done in either domain. In this example, in step 113, the dataset including signals are not transformed, only the portion having the noises is transformed.

Figure 3:
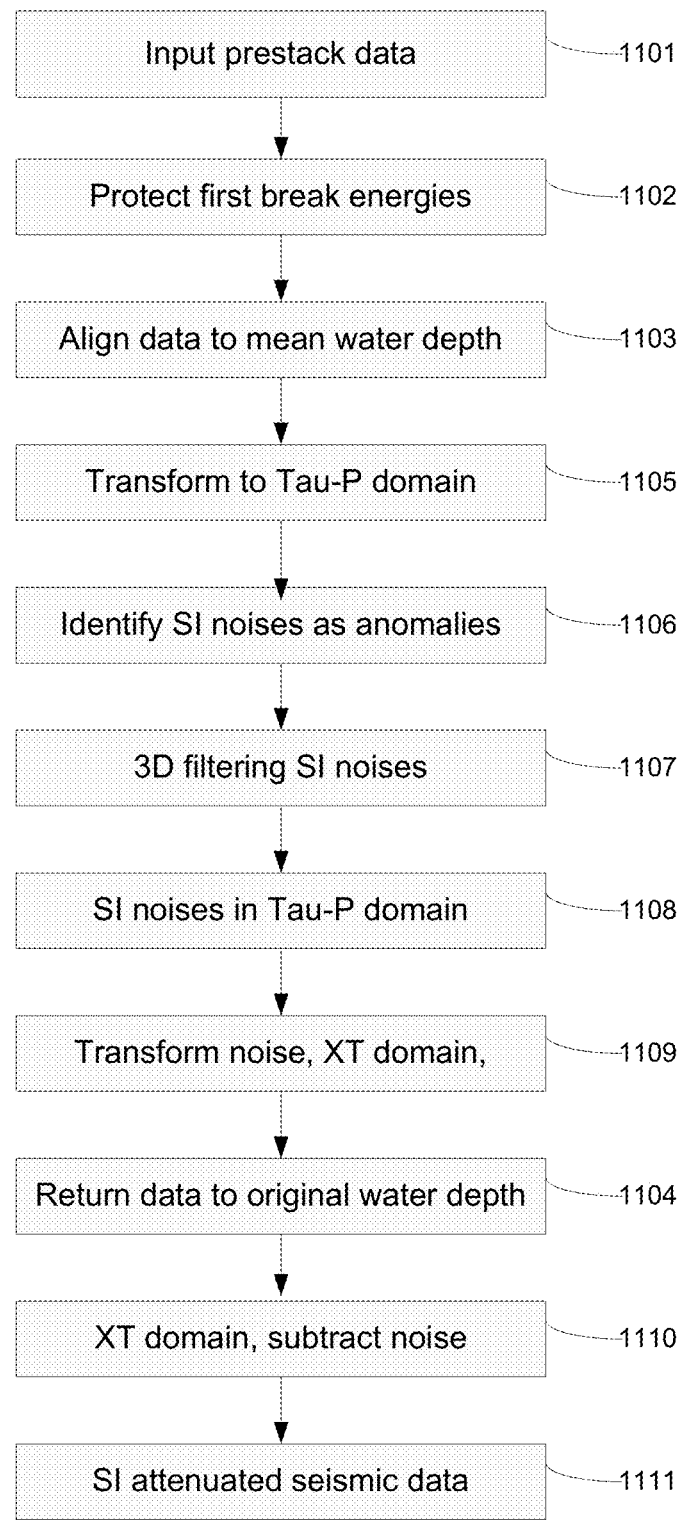
FIG. 3 shows a flow diagram of an alternative embodiment of the current invention.

Now referring to FIG. 3, a slightly different procedure 1100 is described. Method 1100 includes some optional steps, which can be used as follows:

Step 1101. Input all pre-stack shot gathers from a single subsurface line.

Step 1102. The first break energies near water bottom are protected from going to Tau-P transform.

Step 1103. All shot records are aligned to a mean water depth that is an average derived from the data itself. The mean water depth may be derived from the line prior to Tau-P transform. This removes the possible effects of water depth variant on the data, which can affect the comparison between traces or shots in the noise identification and isolation. A time function gain may also be applied to seismic data. If step 1103 is applied, then after SI noises are isolated, a companion step 1104 will be applied to return the SI noises to the original actual water depth. Obviously, if the seabed is fairly flat, this step and its companion step 1104 are not needed.

The above three steps are preparing the data for the Tau-P transformation.

Step 1105. Transform all shot records into Tau-P domain. Ensure that parameters allow fully inverting data from Tau-P domain back to X-T domain. No frequency or dip of the input data should be lost when going through the domain transform process.

In the Tau-P transform, data are decomposed as a series of straight lines which map to points in the Tau-P domain. Hyperbolic events in shot gathers map to elliptical curves in Tau-P. This process is also referred to as slant-stacking since to produce the Tau-P domain the input data may be stacked along a series of slanted lines. The Tau-P transform is used to optimally isolate events with different moveout. SI noise often has a moveout different from the primary reflections.

Step 1106. SI noise is usually visible in the Tau-P domain. The location of the SI noise trends in Tau-P domain is different from shot to shot. These differences and the amplitude signature of the SI permit 3D spatial filters to detect the SI noise as anomalies.

Step 1107. Multi-window 3D spatial filters are designed according to the length, width, and spatial extent of SI in the Tau-P domain. This operation applies to the full frequency range of SI and to all input shot gathers. The spatial filters can be designed using similar methods as described before. The SI noise amplitudes are down-weighted or even scale down to zero as if there are not anomalies. Alternatively, the SI noise amplitudes may be replaced with interpolated amplitude using neighboring traces, which make smoother transitions between traces. It is also possible or more efficient to apply the filtering step in several frequency bands individually to further finely identify the frequency-dependent SI noises.

At the end of step 1107, SI noise attenuated seismic data in Tau-P domain are created, so it is possible to transform them back to X-T domain directly to obtain seismic data free of SI noise. But this direct transformation may introduce transformation errors in the entire dataset, so more steps are usually used to transform only the SI noises, not the entire data set.

Step 1108. At the end of step 1107, 3D spatial filtering process, the SI noise attenuated Tau-P gathers are created. The SI noises are the difference between the data in Tau-P before the filtering process and the data in Tau-P gathers after the SI noises are attenuated.

Step 1109. A domain transform of the SI noise gather from Tau-P back to X-T shot gathers. The SI noises in X-T domain are created.

Step 1104. This is the companion step associated with step 1103: water depth alignment. When step 1103 is applied, the SI noises in X-T domain just created from step 1109 are at the mean water depth. Step 1104 returns the "data"—SI noises back to the original water depth. If step 1103 is not applied, then step 1104 will not be applied.

Step 1110. Finally, subtract the SI noise from input shot gathers to produce the SI attenuated seismic data 1111.

All pre-stack shot gathers from all subsurface lines can be processed in the same manner to remove SI noises from those gathers. Once this is done, other processing procedures may be performed on the data, such as Surface Related Multiple Elimination (SRME), Swelling noise attenuation, migration or imaging.

FIGS. 5-22 show some examples using the methods described above.

Figure 5:
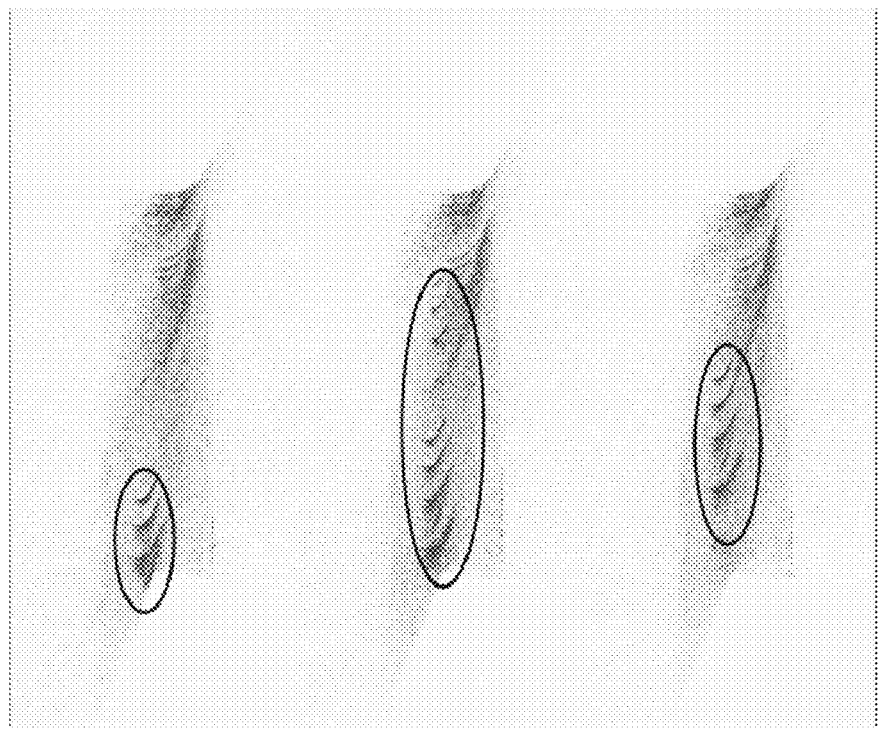
FIG. 5 shows an example data set in Tau-P domain where SI noises are present.
Figure 6:
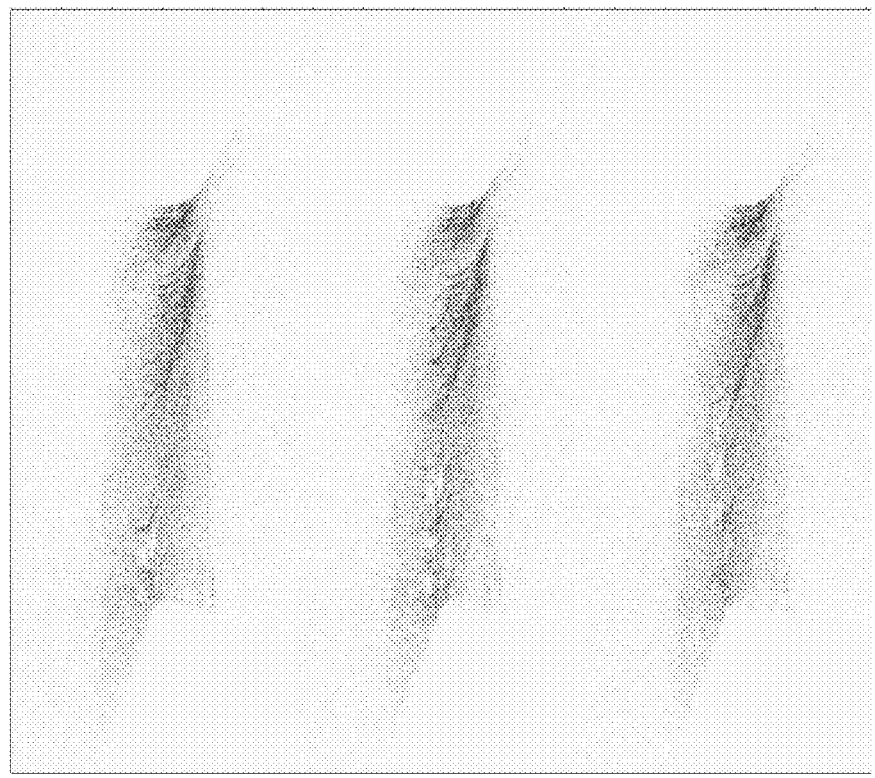
FIG. 6 shows the same example data set as in FIG. 5 after SI noises are subtracted.
Figure 7:
FIG. 7 shows the same data as in FIG. 5 where only the SI noises are shown.

In FIG. 5, the SI noises are clearly visible as anomalies in the Tau-P domain, as indicated by the ovals. The horizontal axis is P value and the vertical axis is Tau value. FIG. 6 shows the same data with the SI noise removed. FIG. 7 shows the SI noise in the same Tau-P domain, which is typically identified and isolated in step 107 in method 100 or step 1108 in method 1100. The SI noise is the difference between the data shown in FIGS. 5 and 6.

Figure 8:
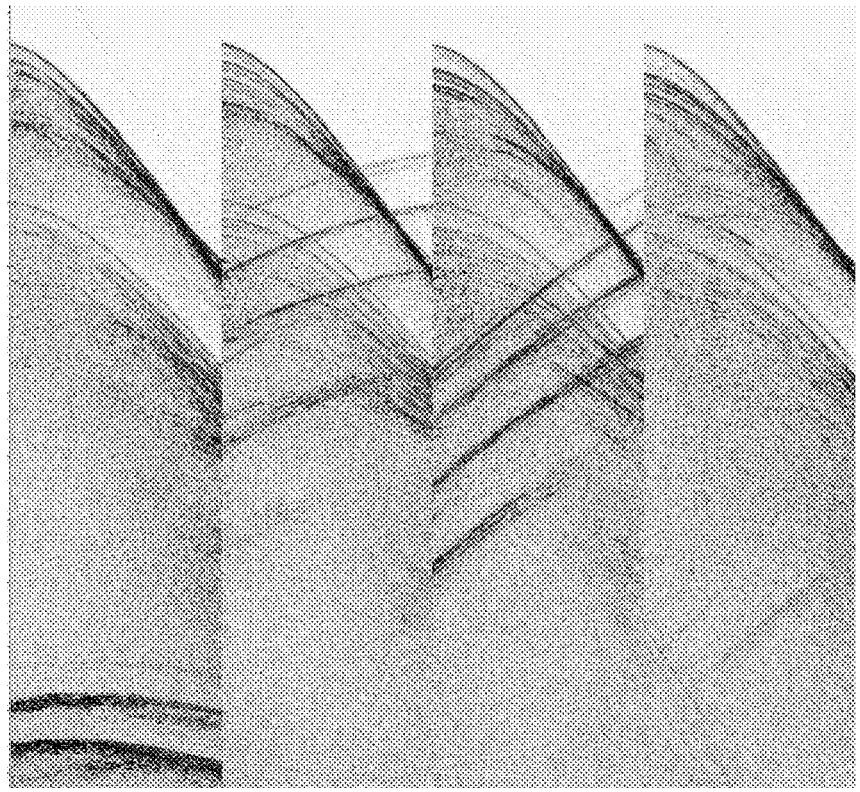
FIG. 8 shows example data set in X-T domain where SI noises are present.
Figure 9:
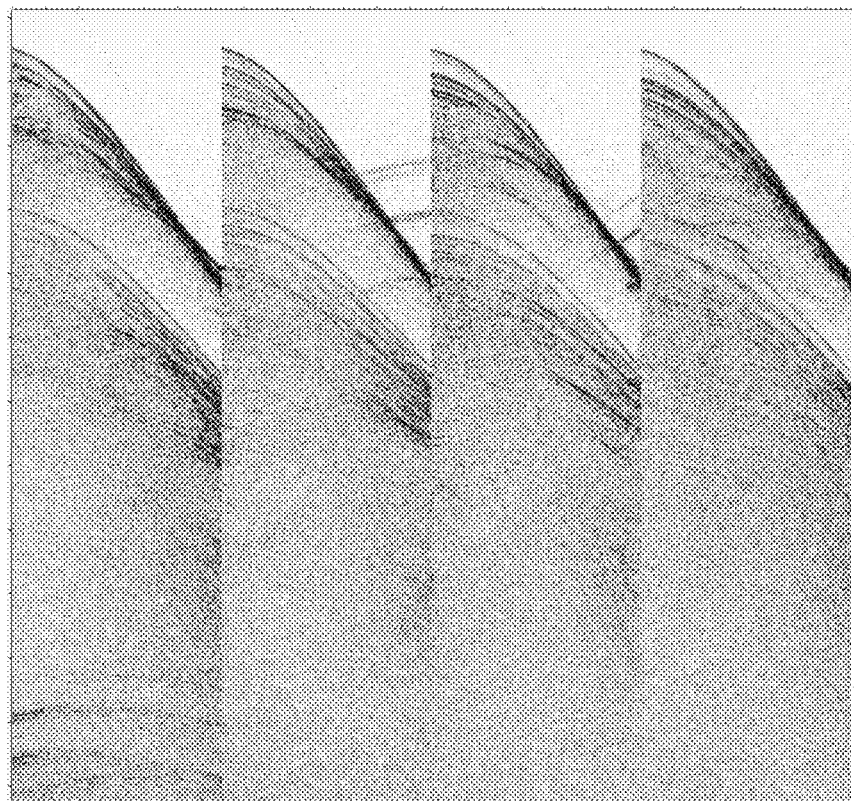
FIG. 9 shows the same example data set as in FIG. 7 after SI noises are subtracted.
Figure 10:
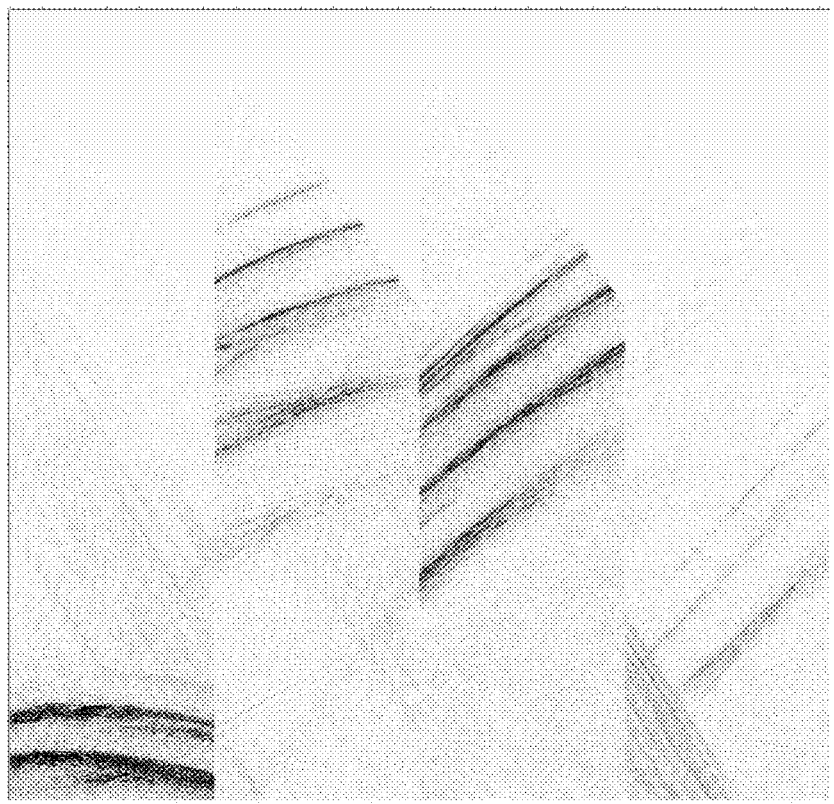
FIG. 10 shows the same data as in FIG. 7 where only the SI noises are shown.

In FIGS. 8-10, the data are shown in X-T domain. Four selected shot examples are presented. FIG. 8 shows the record in X-T domain, before SI noise removal. The horizontal axis is trace number in ascending order within each shot while the vertical axis is time in ascending order from top to bottom. The data have strong SI noises but vary among the shots. FIG. 9 shows the same data after SI noises are identified using the methods discussed above and removed, typically the result 115 as in method 100 or result 1111 in method 1100. FIG. 10 shows the removed SI noises in X-T domain, which is obtained in step 111 in method 100 or step 1109 in method 1100. Even though the SI noises are very different in these four shots, they are properly identified and removed from the data.

Figure 11:
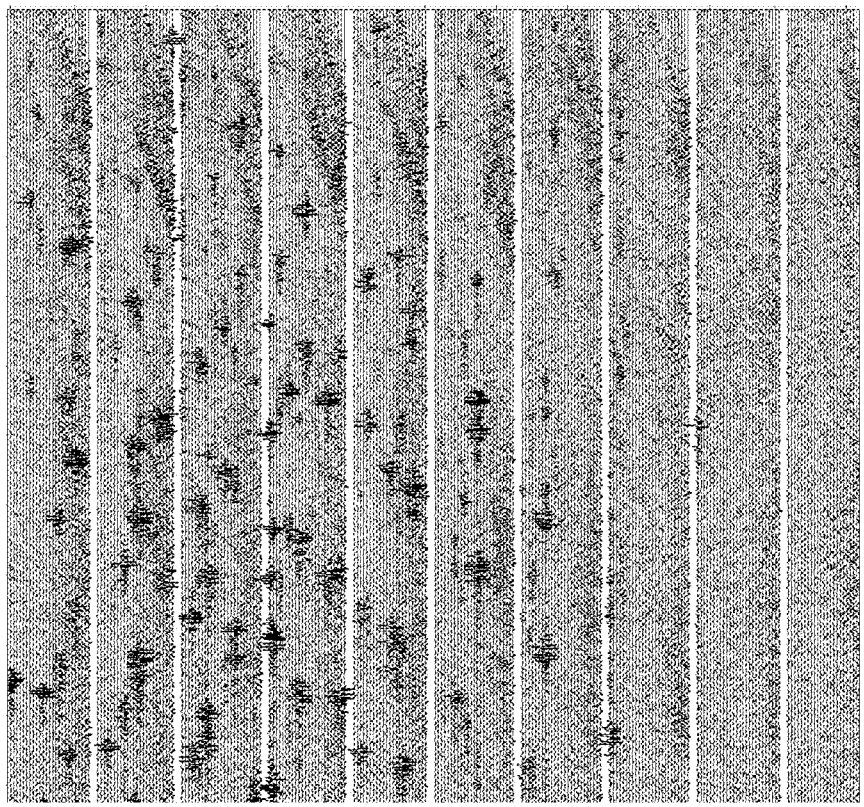
FIG. 11 shows a CMP gather before SI noises are removed.
Figure 12:
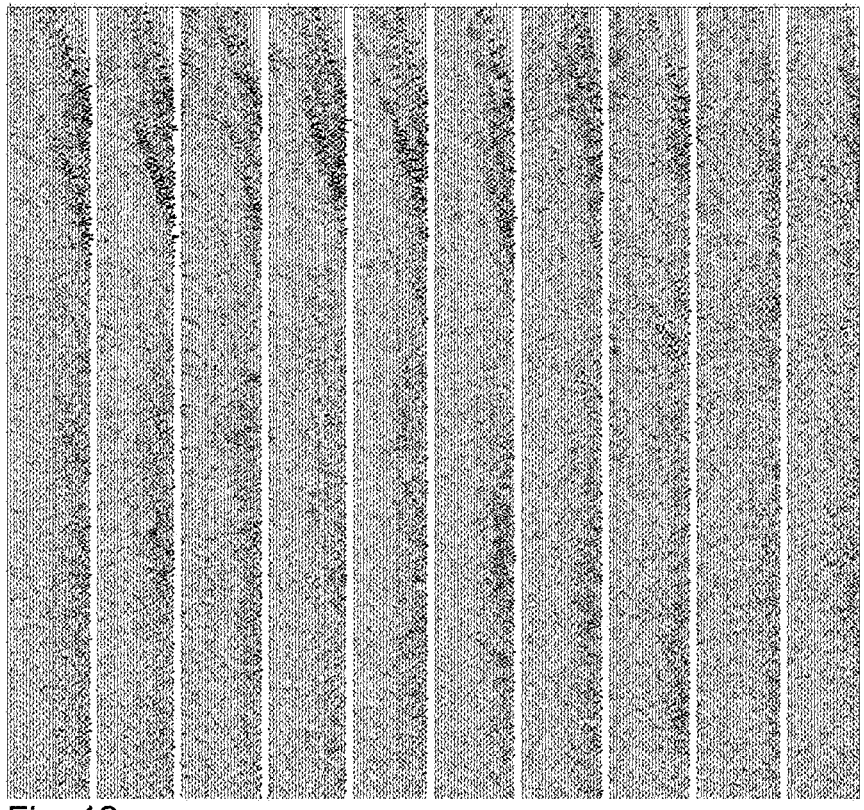
FIG. 12 shows the same data as in FIG. 11 after SI noises are removed.
Figure 13:
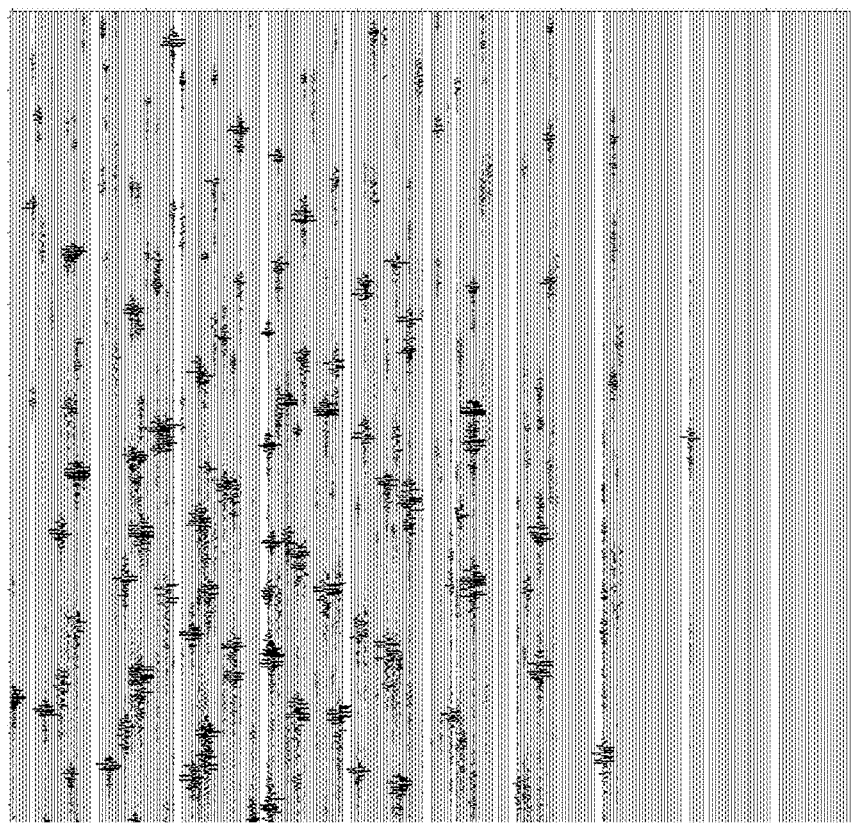
FIG. 13 shows the noises.

FIGS. 11, 12 and 13 show another example of selected CMP gathers in X-T domain. FIG. 11 is the original data with noises, FIG. 12 is the data after the SI noises are removed and FIG. 13 shows the differences. The X axis is offset trace in ascending order starts from left to right within each CMP and the Y axis is time in ascending order from top to bottom; strong SI noises are clearly visible within each CMP gather. Once method 1111 is performed on the gathers, almost all SI noises are removed.

Figure 14:
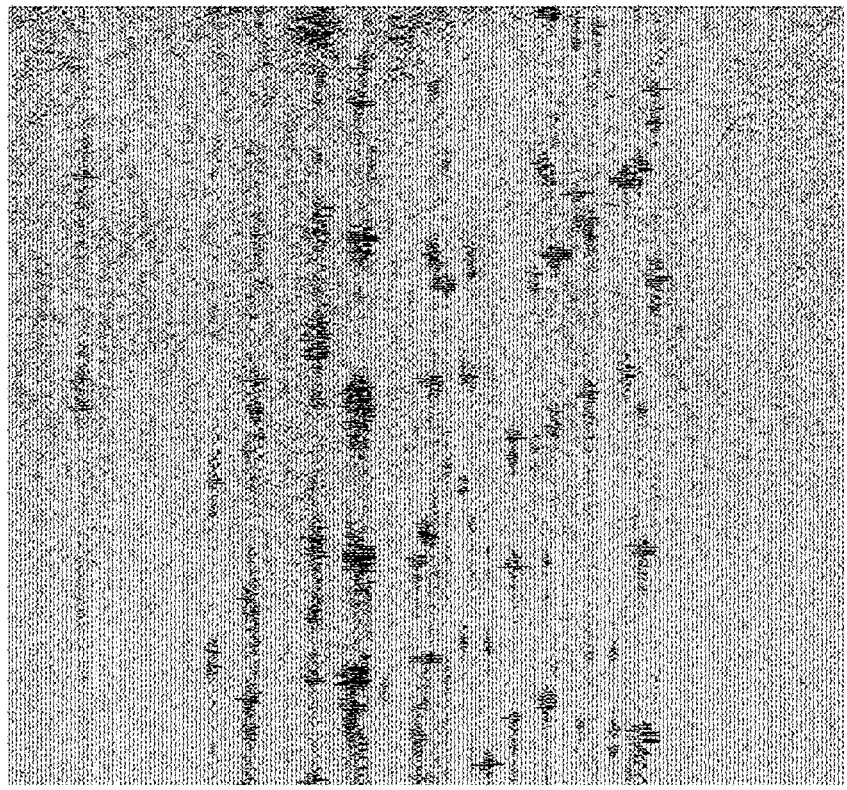
FIG. 14 shows one common trace gather in X-T domain before noise removal.
Figure 15:
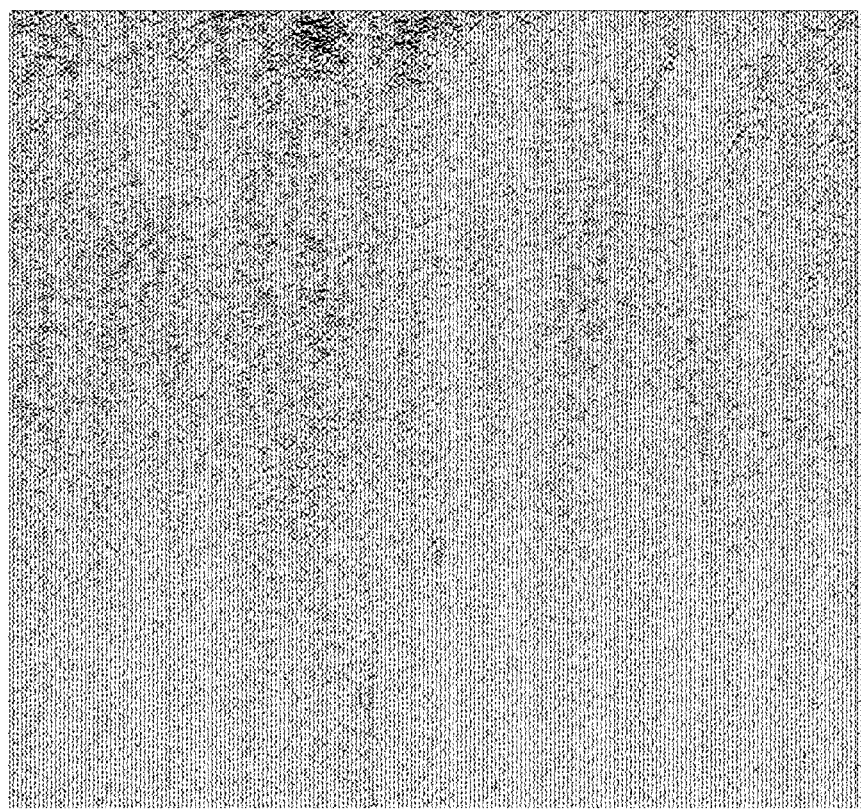
FIG. 15 shows the same common trace gather as in FIG. 14, after noise removal
Figure 16:
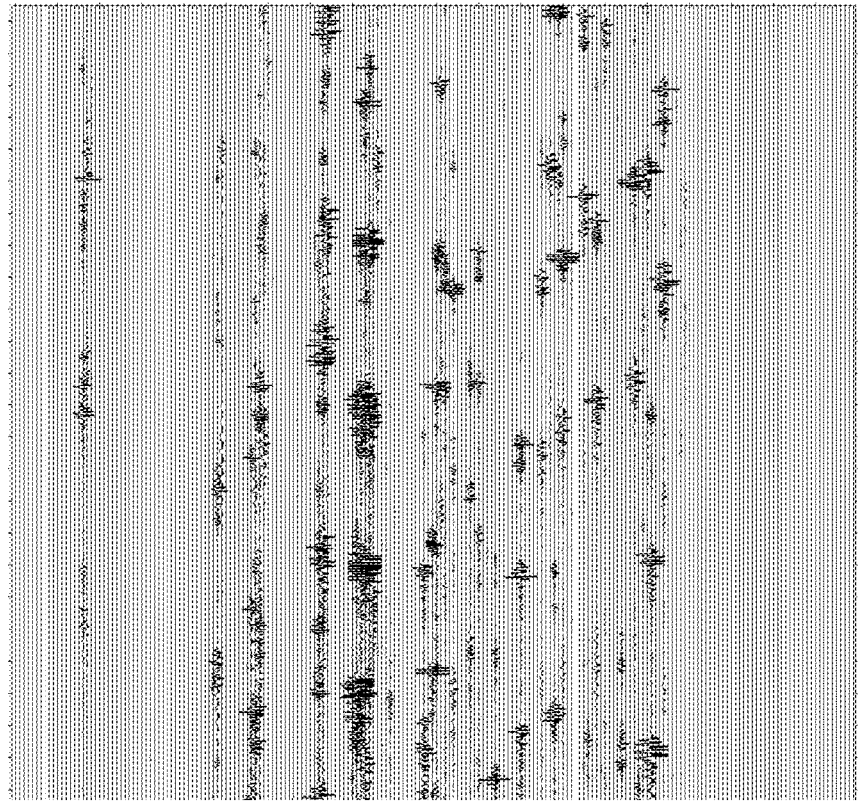
FIG. 16 shows the removed noise.

FIGS. 14, 15 and 16 show an example of a common trace gathers in X-T domain. FIG. 14 is the original data with noises, FIG. 15 is the data after the SI noises are removed and FIG. 16 shows the differences. The X axis is shot point number along the line, each trace represents a different shot, and the Y axis is time in ascending order from top to bottom. Strong SI noises are clearly visible in FIG. 14 but are mostly gone in FIG. 15.

Figure 17:
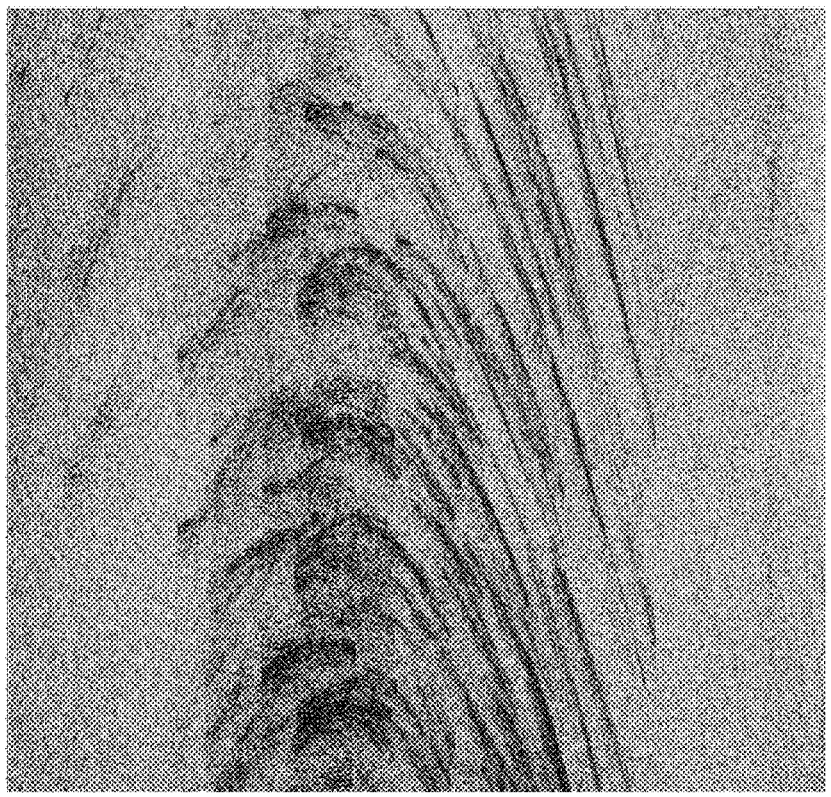
FIG. 17 shows a CMP stack in X-T domain, before noise removal.
Figure 18:
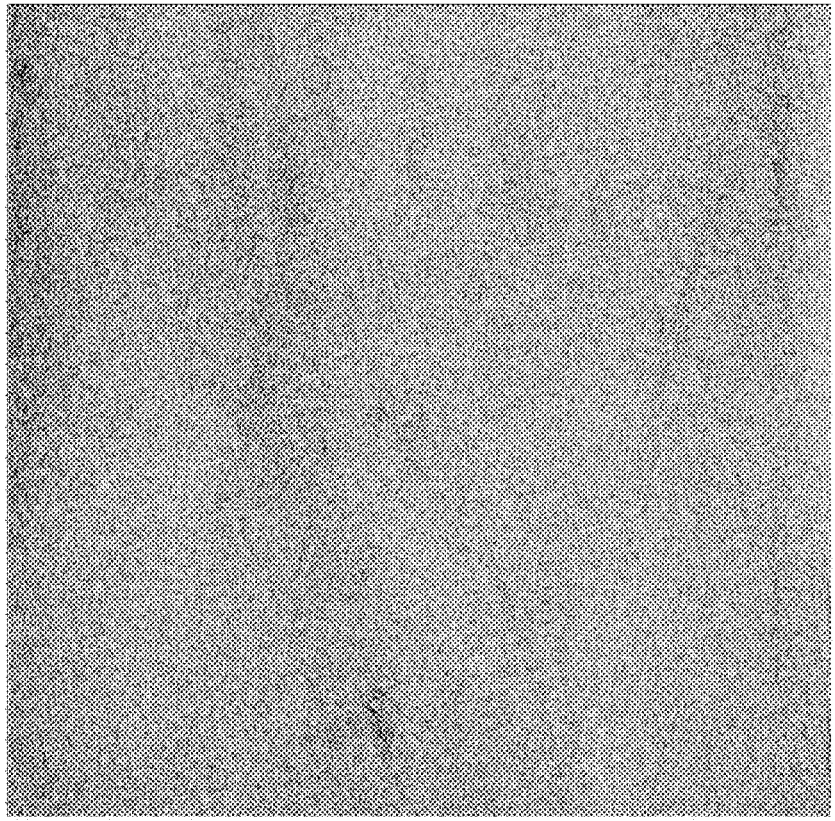
FIG. 18 shows the same stack as in FIG. 17 after noise removal.
Figure 19:
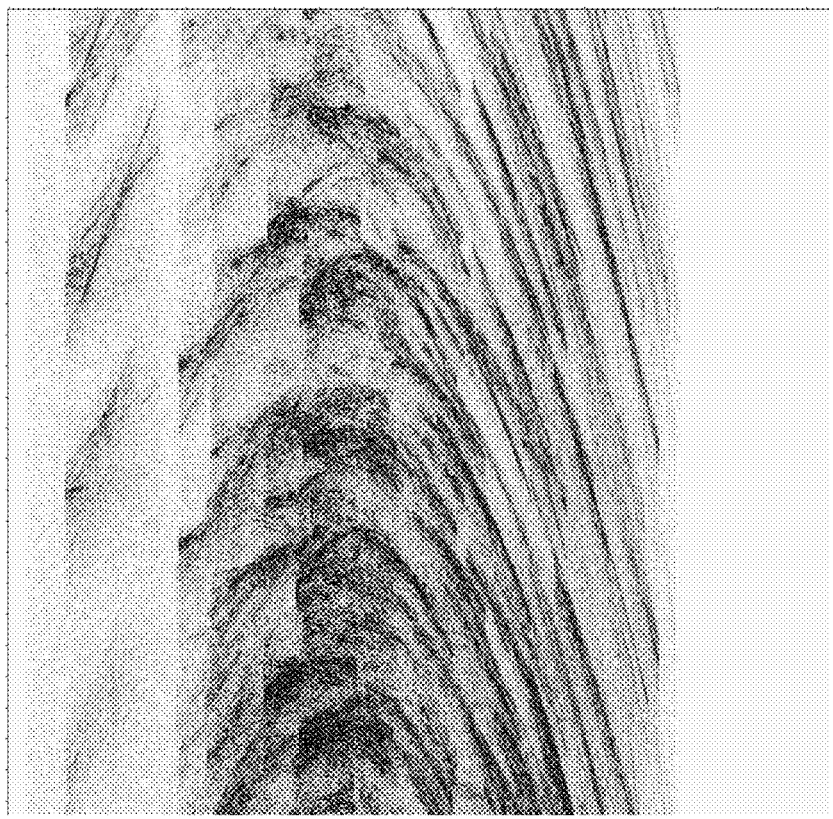
FIG. 19 shows the noise removed.

FIGS. 17, 18 and 19 show an example of a CMP stack in X-T domain. FIG. 17 is the original data with noises, FIG. 18 is the data after the SI noises are removed and FIG. 19 shows the differences. The X axis is CMP number along the line, and the Y axis is time in ascending order from top to bottom. Strong SI noises are clearly visible in FIG. 17. They appear to come from different vessels traveling with various angles against the survey acquisition. FIG. 18 shows the current methods are effective.

Figure 20:
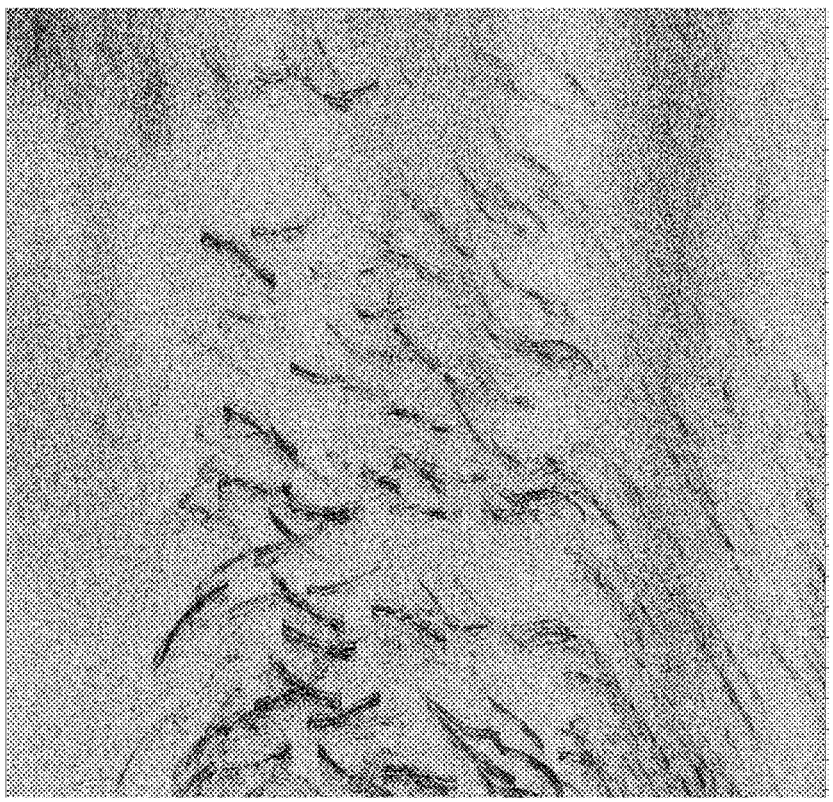
FIG. 20 shows another CMP stack in X-T domain, before noise removal.
Figure 21:
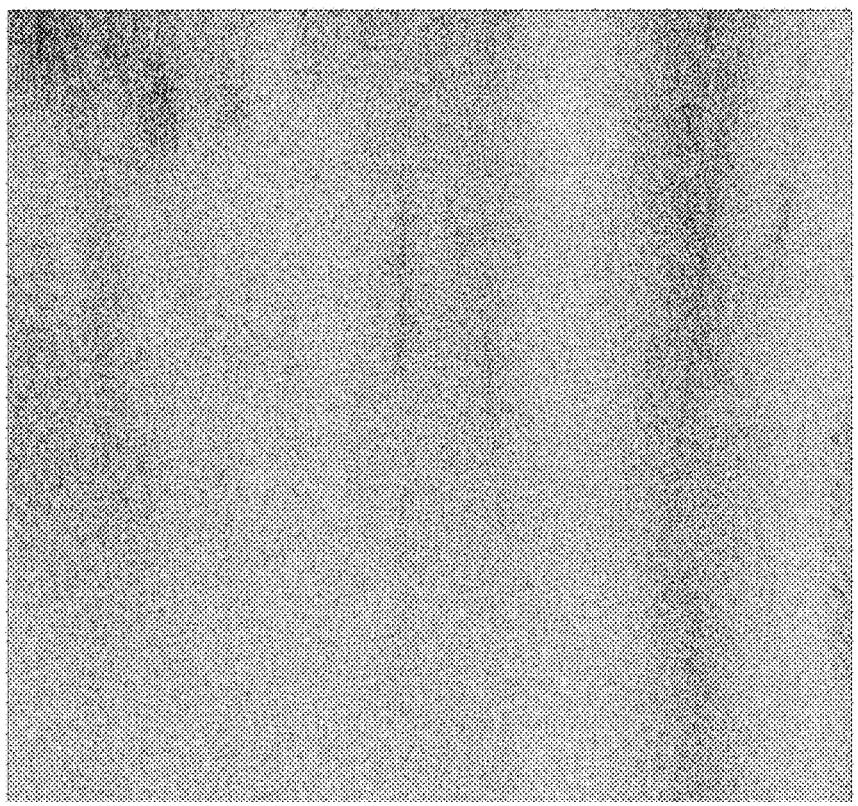
FIG. 21 shows the same stack as in FIG. 20 after noise removal.
Figure 22:
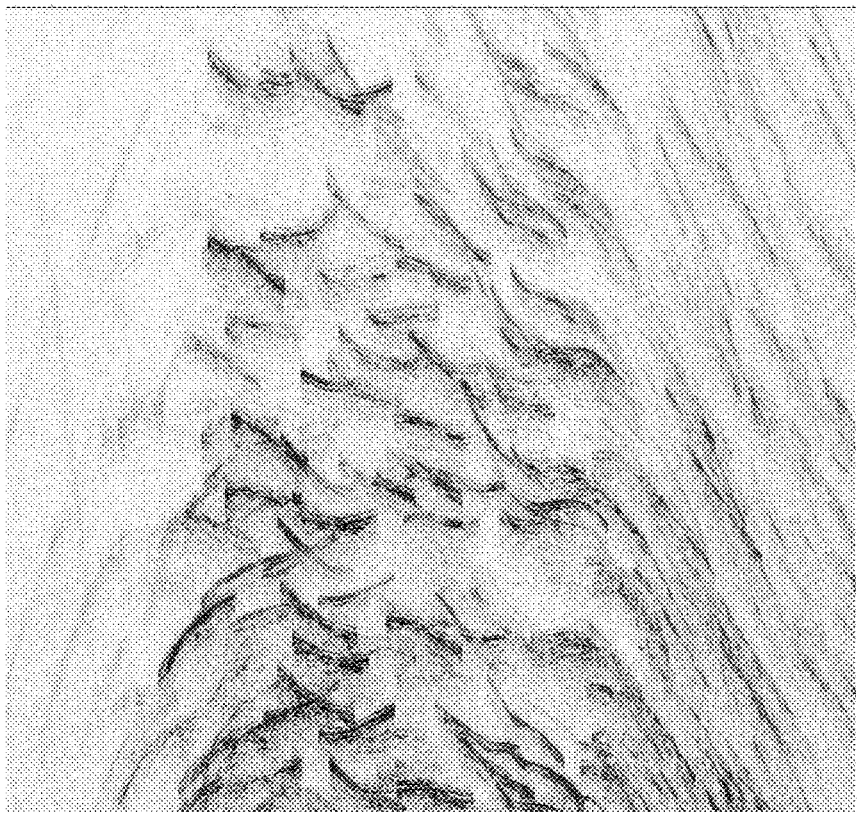
FIG. 22 shows the noise removed.

FIGS. 20, 21 and 22 show another example of a CMP stack in X-T domain. FIG. 20 is the original data with noises, FIG. 21 is the data after the SI noises are removed and FIG. 22 shows the differences. The X axis is CMP number along the line, and the Y axis is time in ascending order from top to bottom. Strong SI noises are visible in this example. But the interfering vessels are very different from the example in FIGS. 17, 18 and 19 in terms of sizes, traveling directions and distances.

Various quality controls steps, displays, and evaluations of seismic data can be performed before and after the applications of the methods. The methods may be implemented in an on-shore data center during data processing, or implemented on a marine seismic vessel during data acquisition for quality control or pre-processing purposes. If the methods are used during data acquisition, they may be executed on part of the computer control system of on-board the marine vessel. The results, as illustrated by the above examples, demonstrate that these methods are robust and effective. Deploying these methods can shorten the total cycle time of seismic acquisition, processing and interpretation by extracting useful information from SI contaminated data. Use of this advanced algorithm reduces the environmental impact of seismic data acquisition by limiting repeat acquisition due to SI noise contamination. Limiting re-shoot time during a seismic project also reduces the overall cost of acquiring the data. Due to the use of these methods, more seismic data acquisition crews may be deployed in the same survey area to help acquire more seismic data without the fear of cross contamination or interference between different crews, which can speed up the exploration and development of the reservoirs.

Figure 4:
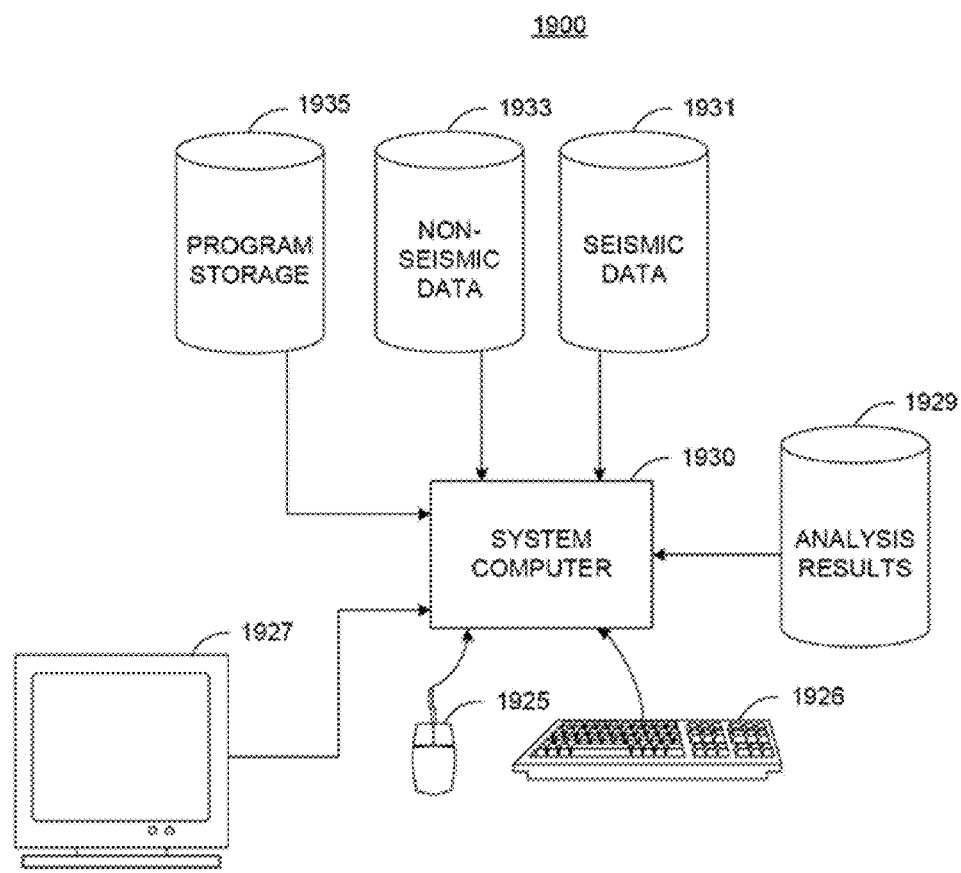
FIG. 4 shows a block diagram of a computer system implementing the methods.

The methods described above are typically implemented in a computer system 1900, one of which is shown in FIG. 4. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A method for attenuating noise in a seismic dataset, the method comprising:

transforming, by a computer system, seismic data of the seismic dataset from an offset-time (X-T) domain to a time-slowness domain;

extracting, by the computer system, anomalies in the time-slowness domain across two or more time-slowness shot gathers;

transforming, by the computer system, the extracted anomalies from the time-slowness domain to the X-T domain; and subtracting, by the computer system, the transformed extracted anomalies in the X-T domain from the seismic data of the seismic dataset to obtain seismic data with noise attenuated.

2. The method of claim 1, further comprising:

preparing the seismic data of the seismic dataset to ensure time-slowness invertibility before transforming the seismic data from the X-T domain to the time-slowness domain.

3. The method of claim 1, further comprising protecting first break energies before transforming the seismic data from the X-T domain to the time-slowness domain.

4. The method of claim 1, further comprising:

scanning, by the computer system, the seismic data across the two or more time-slowness shot gathers in the time-slowness domain using a multi-dimensional filter for the anomalies, wherein the scanning includes identifying, as the anomalies, samples of the seismic data in the time-slowness domain that have amplitudes having a specified relationship with respect to an amplitude threshold, wherein the amplitudes are different from slownesses.

5. The method of claim 4, wherein the multi-dimensional filter is based on the seismic data of the seismic dataset.

6. The method of claim 5, wherein the multi-dimensional filter is based on a spread of seismic interference noises within a time-slowness shot gather and across a consecutive number of time-slowness shot gathers, amplitudes of seismic interference noises and amplitudes of time-slowness shots.

7. The method of claim 5, wherein the multi-dimensional filter includes at least dimension P, dimension Tau and dimension shot position.

8. The method of claim 7, wherein the multi-dimensional filter further includes a dimension of frequency band, offset or azimuth, or their combinations.

9. The method of claim 4, wherein scanning the seismic data in the time-slowness domain using the multi-dimensional filter comprises attenuating amplitudes of the anomalies.

10. The method of claim 1, further comprising:

quality-controlling output data including the obtained seismic data with noise attenuated, wherein the quality-controlling is performed on-board a marine seismic vessel or in an on-shore data processing center.

11. A computer system for attenuating noise in a seismic dataset, the computer system comprising:

a processor; and a non-transient storage, wherein the non-transient storage contains computer instructions that when executed cause the processor to:

transform seismic data of the seismic dataset from an offset-time (X-T) domain to a time-slowness domain;

extract anomalies in the time-slowness domain across two or more time-slowness shot gathers;

transform the extracted anomalies from the time-slowness domain to the X-T domain; and subtract the transformed extracted anomalies in the X-T domain from the seismic data of the seismic dataset to obtain seismic data with noise attenuated.

12. The computer system of claim 11, wherein the non-transient storage further comprises instructions that when executed cause the processor to:

prepare the seismic data of the seismic dataset to ensure time-slowness invertibility before transforming the seismic data from the X-T domain to the time-slowness domain.

13. The computer system of claim 11, wherein the non-transient storage further comprises instructions that when executed cause the processor to scan the seismic data across the two or more time-slowness shot gathers in the time-slowness domain using a multi-dimensional filter for the anomalies, wherein the scanning includes identifying, as the anomalies, samples of the seismic data in the time-slowness domain that have amplitudes having a specified relationship with respect to an amplitude threshold, wherein the amplitudes are different from slownesses.

14. The method of claim 1, further comprising aligning data to mean water depth prior to the transformation to the time-slowness domain, and removing the alignment after the transformation back to the X-T domain.

15. The method of claim 1, wherein the anomalies comprise seismic interference noise, and the obtained seismic data has attenuated seismic interference noise.

16. The method of claim 4, wherein the identifying comprises identifying, as the anomalies, the samples of the seismic data in the time-slowness domain that have amplitudes greater than the amplitude threshold.

17. The method of claim 4, wherein the multi-dimensional filter is a three-dimensional filter that applies filtering of the seismic data in a time dimension, slowness dimension, and shot gather dimension.

18. The computer system of claim 17, wherein the multi-dimensional filter is based on a spread of seismic interference noises within a time-slowness shot gather and across consecutive number of shot gathers, amplitudes of seismic interference noises and amplitudes of time-slowness shots.

19. The computer system of claim 17, wherein the identifying comprises identifying, as the anomalies, the samples of the seismic data in the time-slowness domain that have amplitudes greater than the amplitude threshold.

20. A non-transient computer readable medium storing computer instructions when executed cause a computer to:

transform input seismic data from an offset-time (X-T) domain to a time-slowness domain;

filter anomalies in the seismic data in the time-slowness domain across two or more time-slowness shot gathers;

transform the filtered seismic data from the time-slowness domain to the X-T domain to obtain seismic data with noise attenuated.

* * * * *